United States Patent
Ishii et al.

(10) Patent No.: US 11,555,468 B2
(45) Date of Patent: Jan. 17, 2023

(54) CYLINDER HEAD

(71) Applicant: MITSUBISHI JIDOSHA KOGYO KABUSHIKI KAISHA, Tokyo (JP)

(72) Inventors: Hiroshi Ishii, Tokyo (JP); Mitsutaka Kojima, Tokyo (JP); Shinichi Murata, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/420,746

(22) PCT Filed: Dec. 25, 2019

(86) PCT No.: PCT/JP2019/050946
§ 371 (c)(1),
(2) Date: Jul. 6, 2021

(87) PCT Pub. No.: WO2020/145159
PCT Pub. Date: Jul. 16, 2020

(65) Prior Publication Data
US 2022/0106925 A1     Apr. 7, 2022

(30) Foreign Application Priority Data
Jan. 7, 2019   (JP) .............................. JP2019-000835

(51) Int. Cl.
*F02F 1/42*     (2006.01)
*F02B 75/18*    (2006.01)

(52) U.S. Cl.
CPC ............ *F02F 1/4235* (2013.01); *F02B 75/18* (2013.01)

(58) Field of Classification Search
CPC ........ F02F 1/4235; F02F 1/425; F02F 1/4257; F02B 75/18; F02B 77/02;
(Continued)

(56) References Cited

U.S. PATENT DOCUMENTS

| | | | | |
|---|---|---|---|---|
| 4,660,527 A | * | 4/1987 | Tanaka | ...................... F02F 1/40 123/193.5 |
| 10,753,309 B2 | * | 8/2020 | Ishiura | ................... F02F 11/002 |

(Continued)

FOREIGN PATENT DOCUMENTS

| | | |
|---|---|---|
| EP | 1 081 356 A2 | 3/2001 |
| EP | 1 081 357 A2 | 3/2001 |
| JP | 2018-3600 A | 1/2018 |

OTHER PUBLICATIONS

International Preliminary Report on Patentability and English translation of the Written Opinion of the International Searching Authority dated Jun. 16, 2021 for Application No. PCT/JP2019/050946.
(Continued)

*Primary Examiner* — Grant Moubry
(74) *Attorney, Agent, or Firm* — Birch, Stewart, Kolasch & Birch, LLP

(57) ABSTRACT

A cylinder head includes an intake-side wall part (1a) that upwardly extends from a cylinder head lower surface (1b) coupled to a cylinder block; a port circumferential wall part (4) that forms therein an intake port (3) communicating with a combustion chamber (2) of an engine; an outer longitudinal rib (14) that projects from an outer surface of the port circumferential wall part (4) on a side of the cylinder head lower surface (1b); and a boss part (13) that is bulged from the intake-side wall part (1a) on one end portion of the outer longitudinal rib (14). The port circumferential wall part (4) includes a resin part disposed along an inner surface thereof. The outer longitudinal rib (14) extends in a direction away from the intake-side wall part (1a) along a flow direction of intake air flowing inside the intake port (3). The boss part (13) includes a hole part (13a) that discharges gas in the intake port (3) when injection molding of the resin part is carried out.

19 Claims, 4 Drawing Sheets

(58) Field of Classification Search
CPC ....... F02M 35/10091; F02M 35/10124; F02M 35/10209; F02M 35/10216; F02M 35/10262; F02M 35/10268; F02M 35/10347
See application file for complete search history.

(56) References Cited

U.S. PATENT DOCUMENTS

| | | | |
|---|---|---|---|
| 2006/0272600 A1* | 12/2006 | Tsutsui | F02F 1/22 123/73 PP |
| 2016/0138515 A1* | 5/2016 | Baek | F02F 1/4235 123/193.5 |
| 2018/0058399 A1 | 3/2018 | Yoshida et al. | |

OTHER PUBLICATIONS

International Search Report, issued in PCT/JP2019/050946, dated Feb. 18, 2020.
Written Opinion of the International Searching Authority, issued in PCT/JP2019/050946, dated Feb. 18, 2020.

* cited by examiner

CYLINDER HEAD

TECHNICAL FIELD

This disclosure relates to a cylinder head of an engine.

BACKGROUND ART

A typical cylinder head of an engine is molded by casting with aluminum or an aluminum alloy, for example, and therefore has relatively high thermal conductivity. Consequently, an intake port communicating with the combustion chamber is heated by heat transferred from the combustion chamber, which causes a temperature rise of the intake air flowing through the intake port. When the temperature of the intake air rises, the amount of intake air decreases and knocking tends to occur, which may degrade the engine performance. As a solution to this problem, Patent Document 1 discloses a structure of an intake passage of an engine, which aims at suppressing a temperature rise of the intake air by arranging a resin insulation member in an intake port, for example.
[Prior Art Reference]
[Patent Document]
[Patent Document 1] Japanese Laid-open Patent Publication No. 2018-3600

SUMMARY

[Problems]

An insulation member disposed in an intake port of cylinder head molded with a material such as aluminum as in the above Patent Document 1 is formed by injection molding of resin. In forming a resin part to serve as a heat insulation material by injection molding, a space (injection space) for injecting molten resin to be the resin part is formed and also the sealing face for avoiding leakage of the molten resin is ensured. However, ensuring the sealing face of the injection space can prohibit leakage while the pressure of the injection space is increased, which may lead to generation of crazes and cracks on a wall part forming the intake port.

With the foregoing problems in view, one of the objects of the present embodiment is to suppress the temperature rise of the intake air, avoiding crazes and cracks when placing an insulation member by injection molding of the resin. It addition to the above object, an advantageous effect that is derived from each configuration shown in the following detailed modes to carry out the present disclosure and which is not obtained by the conventional technique can be regarded as another object of the present disclosure.

Means to Solve the Problem (1) A cylinder head disclosed herein includes: an intake-side wall part that upwardly extends from a cylinder head lower surface coupled to a cylinder block; a port circumferential wall part that forms therein an intake port communicating with a combustion chamber of an engine, and that has a resin part disposed along an inner surface thereof; an outer longitudinal rib that projects from an outer surface of the port circumferential wall part on a side of the cylinder head lower surface and that extends in a direction away from the intake-side wall part along a flow direction of intake air flowing inside the intake port; and a boss part that is bulged from the intake-side wall part on one end portion of the outer longitudinal rib and that has a hole part that discharges gas in the intake port when injection molding of the resin part is carried out.

(2) It is preferable that, in the cylinder head, two of the outer longitudinal ribs are provided for the intake port; and the boss part is disposed on the one end portion of at least one of the outer longitudinal ribs.

(3) It is preferable that the cylinder head further includes an inner longitudinal rib that projects from an inner surface of the port circumferential wall part on a side of the cylinder head lower surface and that extends between the two outer longitudinal ribs along the flow direction.

(4) It is preferable that the cylinder head further includes two inner auxiliary ribs that project from the inner surface of the port circumferential wall part, that extend along the flow direction on both side of the inner longitudinal rib, and that have projecting amounts smaller than that of the inner longitudinal rib.

(5) It is preferable that the cylinder head further includes an inner lateral rib that projects from the inner surface of the port circumferential wall part, that extends along a direction intersecting the flow direction, and that has a projecting amount smaller than that of the inner longitudinal rib.

(6) It is preferable that, in the cylinder head, the engine is a multi-cylinder engine and the cylinder head comprises a plurality of the intake ports arranged in parallel; and the cylinder head further comprises an outer lateral rib bridged between the port circumferential wall parts of the intake ports, the port circumferential wall parts are adjacent to each other.

(7) It is preferable that, in the cylinder head, an inner surface of the port circumferential wall part on a side of the cylinder head lower surface is bent into an arch so as to protrude inward the intake port.
[Effects]

According to the disclosed cylinder head, the port circumferential wall part can be reinforced by the outer longitudinal rib. Further, the outer longitudinal rib, which is reinforced by the boss part disposed at one end portion, can further enhance the reinforcing function of the port circumferential wall part. Thus, crazes and cracks can be prevented when placing the resin part as an insulation member by injection molding of the resin. Further, since the temperature rise of the intake air can be suppressed by the resin part, it is possible to suppress the decrease in intake air volume and the occurrence of knocking, thereby improving the engine performance.

DETAILED DESCRIPTION

Figure 1:
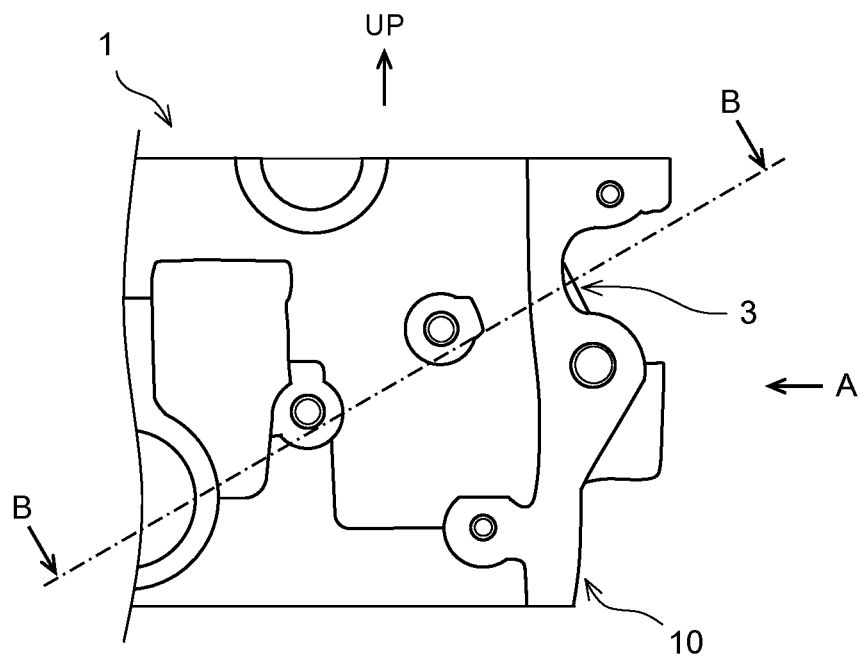
FIG. 1 is a schematic front view of an intake-side part of a cylinder head according to an embodiment, viewed from the front side of an engine.

Referring to the drawings, a cylinder head according to an embodiment will now be described. The following embodiment is merely illustrative and is not intended to exclude the application of various modifications and techniques not explicitly described in the embodiment. Each configuration of the present embodiment can be variously modified and implemented without departing from the scope thereof. Also, the configuration can be selected or omitted according to the requirement or appropriately combined.

[1. Structure of Cylinder Head]

Figure 2:
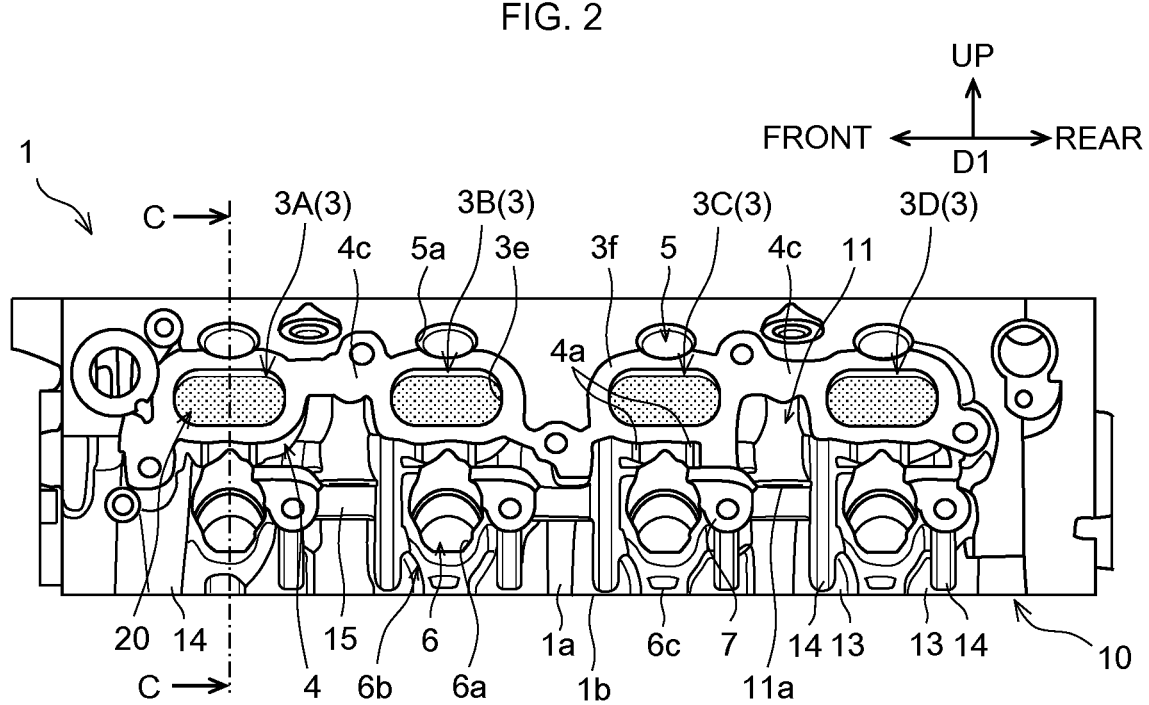
FIG. 2 is a schematic side view of the cylinder head of FIG. 1, viewed from the intake side (seen along A-direction arrow in FIG. 1)

FIG. 1 is a schematic front view showing an intake-side part of a cylinder head 1 according to the embodiment, viewed from the front side of an engine, and FIG. 2 is a schematic side view of the cylinder head 1 (seen along A-direction arrow in FIG. 1). The cylinder head 1 is, for example, a component constituting the engine to be mounted on a vehicle. The present embodiment exemplifies the cylinder head 1 of an engine provided with four cylinders arranged in a row, each of which cylinder has two intake valves and two exhaust valves. Further, the engine of the present embodiment is equipped with an in-cylinder injection valve (not shown) that directly injects fuel into a combustion chamber 2 (see FIG. 3) and a port injection valve (not shown) that injects fuel into the intake port 3.

Figure 3:
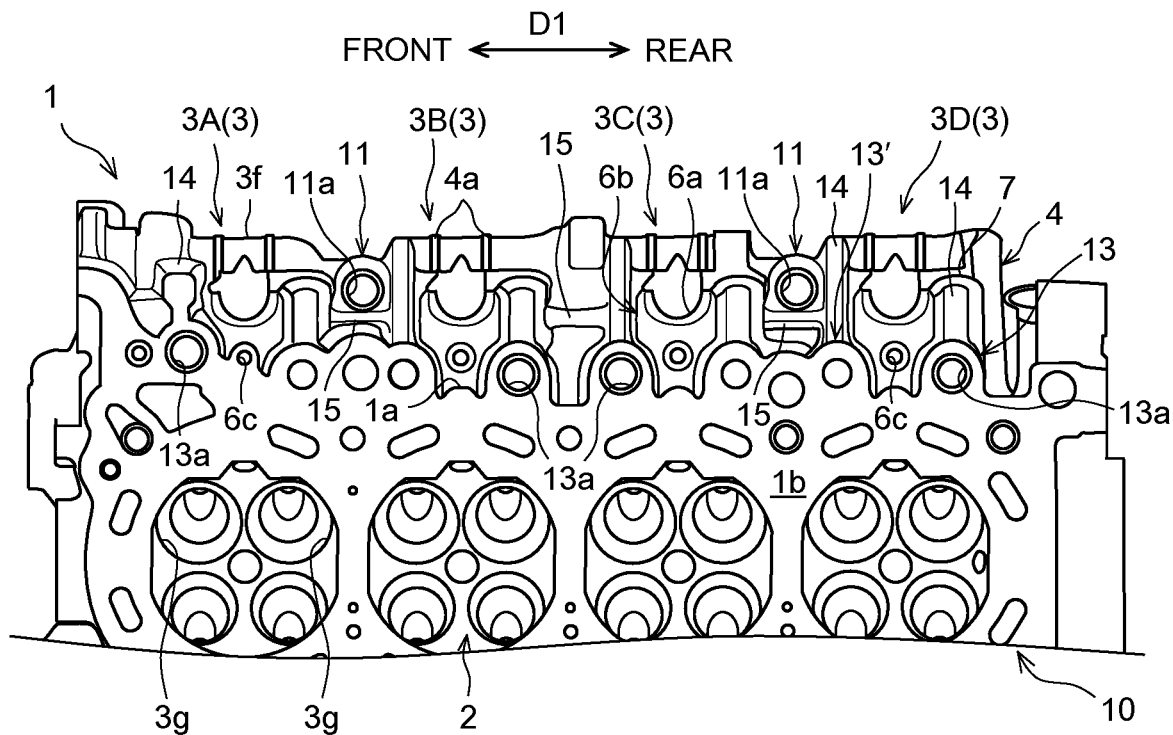
FIG. 3 is a lower-surface view of the cylinder head of FIG. 1.
Figure 4:
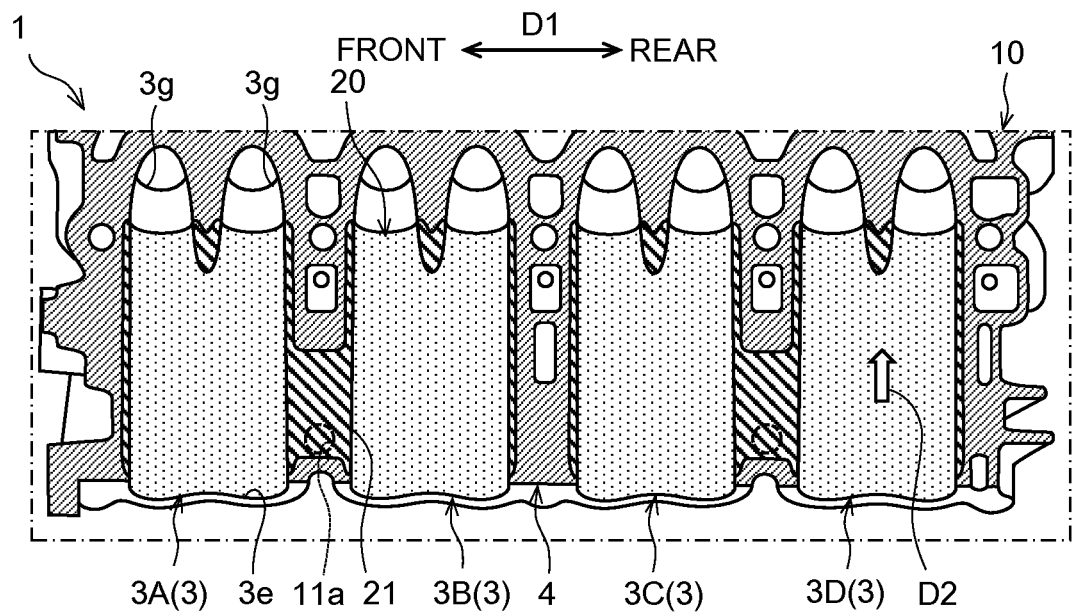
FIG. 4 is a cross sectional view showing an inside of an intake port of the cylinder head of FIG. 1 (cross sectional view taken by the line represented by B-B arrows in FIG. 1)

Hereinafter, the side on which a cylinder block (not shown) is fixed to cylinder head 1 is defined as the "lower side", the opposite side thereto is defined as the "upper side", and accordingly, the up-down direction is defined. The up-down direction of the cylinder head 1 may be same as or different from the up-down direction (i.e., vertical direction) defined when the engine is mounted on the vehicle or the like. Hereinafter, the simple "up-down direction" means the up-down direction of cylinder head 1. FIG. 3 is a lower-surface view (diagram of the cylinder head 1 seen from the side of the lower surface 1b) of the cylinder head 1, and FIG. 4 is a cross sectional view showing an inside of an intake port 3 (cross sectional view taken by line of the B-B arrows in FIG. 1).

As shown in FIG. 2, the cylinder head 1 includes a cylinder head main body 10 molded by casting, for example, aluminum or aluminum alloy, and a resin part 20 arranged inside the intake port 3. The cylinder head main body 10 constitutes the main body part of the cylinder head 1. Among the cylinder head 1, configurations (e.g., such as the intake port 3 described above, the mounting holes 5 and 6, and fixing boss 7 that are to be described below) except for the resin part 20 are provided in the cylinder head main body 10. For easily grasping, the resin part 20 is indicated by being dotted in FIGS. 2 and 4.

As shown in FIGS. 2 and 3, the lower surface 1b (hereinafter, also referred to as "cylinder head lower surface 1b") of the cylinder head 1 is processed in a flat face perpendicular to the up-down direction and serves as a joint surface with the cylinder block. On the cylinder head lower surface 1b, a combustion chamber 2 that forms the upper part of the cylinder is recessed. The cylinder head 1 is coupled to the cylinder block with a gasket (not shown) interposed between the cylinder head lower surface 1b and the upper surface of the cylinder block. This means that the cylinder head lower surface 1b is joined to the cylinder block.

On the cylinder head 1, an intake port 3 that communicates with the combustion chamber 2, the mounting hole 5 to which a port injection valve is attached, a mounting hole 6 to which the in-cylinder injection valve is attached, and a fixing boss 7 that fixes a delivery pipe to be connected to the in-cylinder injection valve are formed for each intake port 3. The intake port 3 and the mounting holes 5 and 6 all open to the outside of the cylinder head 1. The opening 3e (upstream end) of the intake port 3 is formed into an oval shape, and a non-illustrated intake manifold is connected to a flange face 3f of the intake port 3.

Figure 5:
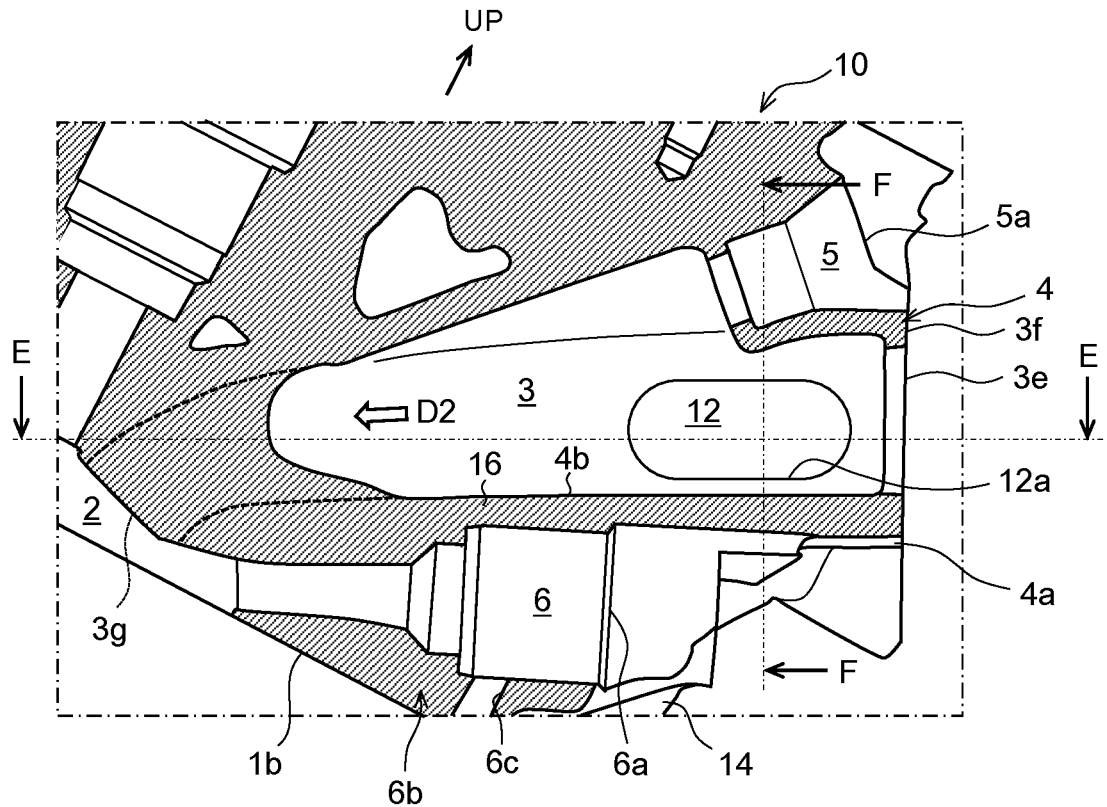
FIG. 5 is a cross sectional view showing a structure around the intake port of the cylinder head of FIG. 1, imaginarily omitting a resin part (cross sectional view taken by line of the C-C arrows in FIG. 2)

Specifically, as shown in FIG. 2, an opening 5a of the mounting hole 5 of the port injection valve is positioned above the opening 3e of the intake port 3, and an opening 6a of the mounting hole 6 of the in-cylinder injection valve is positioned below the opening 3e. That is, as shown in FIG. 5, the mounting hole 5 of the port injection valve is positioned above the intake port 3, and the mounting hole 6 of the in-cylinder injection valve is positioned under intake port 3. Incidentally, FIG. 5 is a cross sectional view (i.e. cross sectional view of cylinder head main body 10) omitting the resin part 20 from the structure around the intake port 3 of the cylinder head 1 and corresponds to the cross sectional view taken by line of the C-C arrows in FIG. 2.

Further, the three opening 3e, 5a, 6a are positioned on the outer side in an intake and exhaust direction (i.e., the front side of the drawing in FIG. 2) with respect to an intake-side wall part 1a perpendicularly erected from the cylinder head lower surface 1b. Here, the "intake and exhaust direction" is a direction (a left and right direction of the engine) perpendicular to both the above up-down direction and the cylinder-line direction (the direction in which the cylinders are aligned). In FIGS. 2 to 4, the reference signs of the elements (the intake port 3, the mounting holes 5 and 6, and the fixing boss 7) similarly provided to the four cylinders are attached to only one of the cylinders.

On the cylinder head 1 of the present embodiment, four intake ports 3 are arranged in a line. Hereinafter, the direction D1 in which the four intake ports 3 is aligned is referred to as the "port aligning direction D1". Further, when the four intake ports 3 are distinguished from one another, four intake ports 3 are called, from the front side of the engine, a first intake port 3A, a second intake port 3B, a third intake port 3C, and a fourth intake port 3D. The port aligning direction coincides with the front-rear direction of the engine and also the cylinder-line direction, and is perpendicular to the up-down direction and the intake and exhaust direction. As shown in FIG. 4, in the present embodiment, each intake port 3 is formed in a bifurcated shape which communicates with the combustion chamber 2 through two intake valve holes 3g. In each intake port 3, the intake air flows from the opening 3e toward the intake valve 3g. Hereinafter, the direction in which the intake air flows is referred to as a "flow direction D2".

As shown in FIG. 2, the cylinder head 1 of the present embodiment includes the above intake-side wall part 1a, a port circumferential wall part 4 that forms therein the intake port 3 and that has a resin part 20 disposed along the inner surface thereof, and a mounting circumferential wall part 6b in which the mounting hole 6 of the in-cylinder injection valve are formed. The cylinder head 1 of the present embodiment further includes an outer longitudinal rib 14 provided on the outer surface of the port circumferential wall part 4, the boss parts 13 and 13' disposed on the base portion (one end portion) of the outer longitudinal rib 14, and an outer lateral rib 15 which is bridged between the port circumferential wall parts 4 being adjacent to each other.

As shown in FIGS. 2 and 3, the port circumferential wall part 4 is a cylindrical portion extending in a direction away from the intake-side wall part 1a, and the inner space thereof serves as the intake port 3 as shown in FIG. 5. As shown in FIGS. 2 and 3, the four port circumferential wall parts 4 are formed into the substantially same shape, and arranged at substantially equal intervals in the port aligning direction D1. Since the opening 3e of intake port 3 of the present embodiment is an oval shape, a part of the lower surface 4b (surface 4b on the side of the cylinder head lower surface 1b) at the upstream side of the port circumferential wall part 4 is substantially flat.

A mounting circumferential wall part 6b is a cylindrical portion which extends in a direction away from the intake-side wall part 1a, and, as shown in FIG. 5, has an inner space that is to serve as the mounting hole 6. The mounting circumferential wall part 6b is extended in the same direction (i.e., the flow direction D2) as the extending direction of the port circumferential wall part 4 from the intake-side wall part 1a. As shown in FIGS. 2 and 3, the four mounting circumferential wall parts 6b are formed into the substantially same shape and are provided one on the lower side of each of the four port circumferential wall parts 4 (on the side respect to the cylinder head lower surface 1b of each port circumferential wall part 4). The mounting circumferential wall part 6b is partially shared with the port circumferential wall part 4. Specifically, as shown in FIG. 5, the lower surface portion of the port circumferential wall part 4 and the upper surface part of the mounting circumferential wall part 6b are formed of a common portion. In addition to a function as for being attached with the in-cylinder injection valve, the mounting circumferential wall part 6b has a function for reinforcing the port circumferential wall part 4.

As shown in FIG. 3, the mounting circumferential wall part 6b of the present embodiment is extended from the intake-side wall part 1a to the middle of the port circumferential wall part 4 in the flow direction D2 and, as shown in FIG. 5, the opening 6a is positioned below the port circumferential wall part 4. Further, as shown in FIGS. 3 and 5, the mounting peripheral wall portion 6b has a drain hole 6c formed by penetrating a part on the side of the cylinder head lower surface 1b. The drain hole 6c is a through-hole formed in the mounting circumferential wall part 6b so as to extend in the up-down direction, and has a function for draining out water droplets condensed from moisture in the air to prevent the water droplets from staying in the mounting hole 6.

The port circumferential wall part 4 has a protruding part 4a that protrudes from the outer surface of the port circumferential wall part 4 on the side of the cylinder head lower surface 1b and also on the upstream side (i.e., the upstream side where the mounting circumferential wall part 6b is absent) of the end portion in the extending direction of the mounting circumferential wall part 6b. The protruding part 4a is extended along the flow direction D2 on the outer surface of the lower side of the port circumferential wall part 4. In the cylinder head 1 of the present embodiment, two parallel protruding parts 4a are formed for each intake port 3. Each protruding part 4a is protruded downward from the flat outer surface of the port circumferential wall part 4 and has a function as a reinforcing rib.

As shown in FIGS. 2 and 3, the outer longitudinal rib 14 is formed so as to protrude downward from the outer surface of the port circumferential wall part 4 on the side of the cylinder head lower surface 1b, and is also extended along the flow direction D2 and also along a direction away from the intake-side wall part 1a. In the cylinder head 1 of the present embodiment, two outer longitudinal ribs 14 are provided for each intake port 3 so as to sandwich the single mounting circumferential wall part 6b from the port aligning direction D1. The outer longitudinal rib 14 has a function of reinforcing the port circumferential wall part 4.

In the cylinder head 1 of the present embodiment, except for the first intake port 3A located at the foremost, the outer longitudinal ribs 14 of the front side (left side in the drawing) of the mounting circumferential wall part 6b are extended from the intake-side wall part 1a to the respective flange faces 3f. In FIGS. 2 and 3, the reference sign 14 is attached only to the front-side outer longitudinal rib provided to the fourth intake port 3D. Further, the outer longitudinal rib 14 on the front side of the mounting circumferential wall part 6b in the first intake port 3A is shorter than the other outer longitudinal ribs 14 described above due to the spacial restriction.

Further, in the cylinder head 1 of the present embodiment, the outer longitudinal rib 14 on the rear side (right side in the drawing) of the mounting circumferential wall part 6b is extended from the intake-side wall part 1a to the middle of the port circumferential wall part 4 along the flow direction D2. In FIGS. 2 and 3, like the front-side outer longitudinal rib 14, the reference sign 14 is attached only to the rear-side outer longitudinal rib provided to the fourth intake port 3D. In the present embodiment, the end part (outer end portion of the intake and exhaust direction) of the rear-side longitudinal rib 14, the fixing boss 7 described above is integrally formed.

The boss parts 13 and 13' are bulged from the intake-side wall part 1a at the base portion of each outer longitudinal rib 14. The boss parts 13 and 13' has the lower-end surfaces formed to be flush with the cylinder head lower surface 1b, and therefore can be said a portion erected from the cylinder head lower surface 1b. The base portion of the outer longitudinal rib 14 is connected to the surfaces of the boss parts 13 and 13' facing the outside of the intake and exhaust direction. In other words, the outer longitudinal rib 14 is extended from the boss parts 13 and 13' in the flow direction D2. Incidentally, in FIGS. 2 and 3, the reference signs 13 and 13' are attached to only the boss parts provided to the fourth intake port 3D.

As shown in FIG. 3, a gas relief hole 13a (hole part) that discharges gas in the intake port when injection molding of the resin part 20 is carried out is formed on the boss part 13. On the other hand, although a hole part is formed also on the boss part 13', the boss part 13' is a dummy boss. That is, in the cylinder head 1 of the present embodiment, the boss part 13 having the gas relief hole 13a is placed at the base portion of one of the outer longitudinal ribs 14 and the dummy boss part 13' is disposed at the base portion of the other outer longitudinal rib 14.

An outer lateral rib 15 is provided so as to extend in the port aligning direction D1 and connect neighboring (adjacent) port circumferential wall parts 4. Three outer lateral ribs 15 are provided in the cylinder head 1 of the present embodiment. Each outer lateral rib 15 connects the adjacent outer longitudinal ribs 14 to each other and has a function of indirectly reinforcing the port circumferential wall part 4 by reinforcing the outer longitudinal ribs 14.

Figure 6:
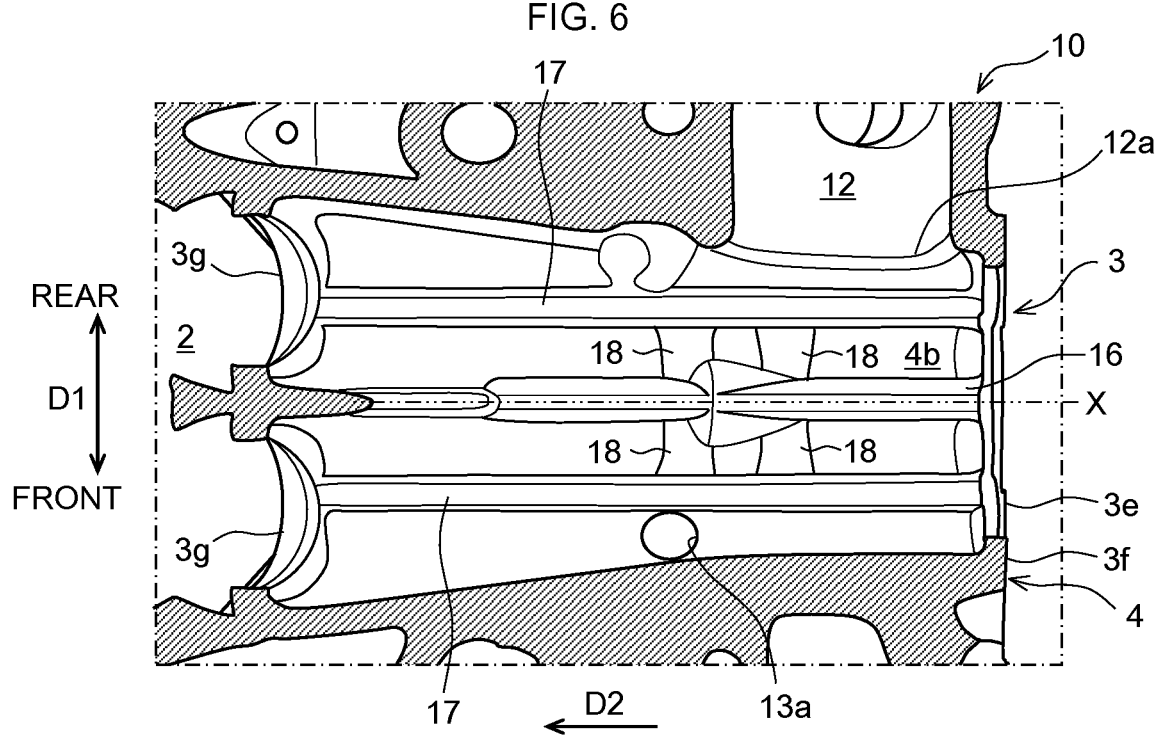
FIG. 6 is a cross sectional view explaining an inner surface structure of a port circumferential wall part of the cylinder head of FIG. 1 (cross sectional view taken by line of the E-E arrows in FIG. 5)

In addition to the two types of ribs 14 and 15 provided on the outer surface side of the port circumferential wall part 4, the cylinder head 1 of the present embodiment has three types of ribs 16, 17 and 18 provided on the inner surface (i.e., the lower surface 4b) side of the lower side of the port circumferential wall part 4. As shown in FIG. 6, the cylinder head main body 10 of the cylinder head 1 is provided with one inner longitudinal rib 16 which upward protrudes from the lower surface 1c of the port circumferential wall part 4 and also extends along the flow direction D2, two inner auxiliary ribs 17 which extend along the flow direction D2 at the both sides of the inner longitudinal rib 16, and the inner lateral rib 18 which extends along the direction intersecting the flow direction D2.

The inner longitudinal rib 16 is arranged between the two outer longitudinal ribs 14 provided on the outer surface of the port circumferential wall part 4. That is, when viewed through the port circumferential wall part 4 from the up-down direction, the inner longitudinal rib 16 is arranged between the two outer longitudinal ribs 14. Incidentally, the inner longitudinal rib 16 of the present embodiment is disposed on an imaginary straight line X (see FIG. 6) passing a bifurcating point at which the intake port 3 bifurcates and extending in the flow direction D2.

Figure 7:
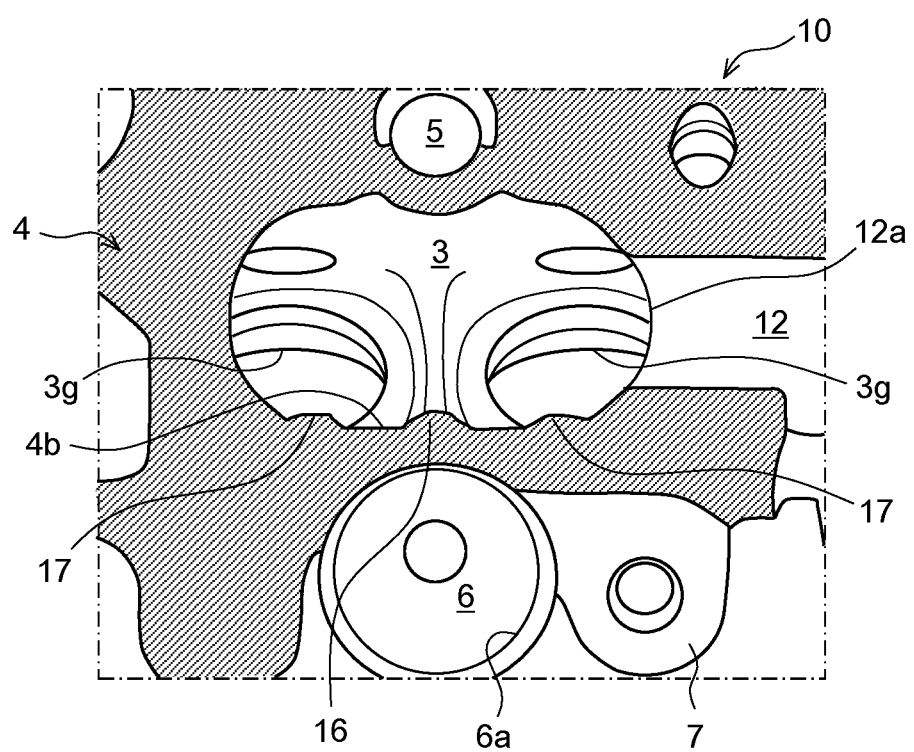
FIG. 7 is a cross sectional view explaining an inner surface structure of the port circumferential wall part of the cylinder head of FIG. 1 (cross sectional view taken by line of the F-F arrows in FIG. 5).

The inner auxiliary ribs 17 are projected upward from the lower surface 4b of the port circumferential wall part 4, the projecting amounts thereof are set smaller than that of the inner longitudinal rib 16. As shown in FIG. 7, in the cylinder head 1 of the present embodiment, two inner auxiliary ribs 17 are symmetrically arranged, sandwiching the inner longitudinal rib 16 and the three longitudinal ribs 16 and 17 are provided in substantially parallel. When viewed through the port circumferential wall part 4 from the up-down direction, it is preferable that the two outer longitudinal ribs 14 are displaced from the two inner auxiliary ribs 17. This structure can reinforce the overall part of the port circumferential wall part 4, without partially reducing the wall thickness of the port circumferential wall part 4.

In addition, the lower surface 4b of the port circumferential wall part 4 is preferably curved into an arch shape so as to protrude upward (i.e., inward the intake port 3). This structure can increase thickness of the port circumferential wall part 4 at the central portion of the intake port 3 in the port aligning direction D1 4, and therefore increases the stiffness of the port circumferential wall part 4.

As shown in FIG. 6, the inner lateral rib 18 is projected upward from the lower surface 4b of the port circumferential wall part 4, the projecting amount thereof is set smaller than that of the inner longitudinal rib 16. Incidentally, the projecting amount of the inner lateral rib 18 is preferably smaller than those of the inner auxiliary ribs 17. In the cylinder head 1 of the present embodiment, two pairs of inner lateral ribs 18 that connect the inner longitudinal rib 16 with the left and right inner auxiliary ribs 17 are juxtaposed in the flow direction D2, which means that four inner lateral ribs 18 are provided in total. The inner lateral ribs 18 of the present embodiment are extended in a direction perpendicular to the flow direction D2.

As described above, the cylinder head 1 of the present embodiment includes the resin part 20 arranged inside the intake port 3. Since the resin part 20 is formed by injection molding of resin, the cylinder head main body 10 has a part for injecting molten resin that is to form a resin part 20. Specifically, as shown in FIGS. 2 and 3, the cylinder head main body 10 has mounting parts 11 each in a substantially cylindrical shape on which an inlet 11a for injecting molten resin is formed. The mounting parts 11 of the present embodiment are provided at two points of between the first intake port 3A and the second intake port 3B and between the third intake port 3C and the fourth intake port 3D.

Each mounting part 11 is downward extended along the intake-side wall part 1a from a coupling part 4c that connects the upstream portions of the respective port circumferential wall parts 4 of two neighboring intake ports of the intake ports 3A, 3B, 3C and 3D, and each mounting part 11 opens downward. This opening is the inlet 11a. The lower end surface of the mounting part 11 where the inlet 11a is formed is provided in parallel to the cylinder head lower surface 1b. The inlet 11a is a supplying port into which the tip of an injection machine (not shown) that injects molten resin is inserted to supply (inject) the molten resin.

As shown in FIG. 3, the above gas relief hole 13a opens to the cylinder head lower surface 1b. In the cylinder head 1 of the present embodiment, one inlet 11a is provided for the two intake ports 3, and one gas relief hole 13a is provided for one intake port 3. The gas relief hole 13a is arranged at a position distant from the inlet 11a in the port aligning direction D1.

As shown in FIG. 5, the cylinder head main body 10 of the present embodiment is provided with a space (hereinafter referred to as "resin passage 12") in which the molten resin injected from the inlet 11a flows to the intake port 3. The resin passage 12 is extended from the inlet 11a to each of the two intake ports 3 on both sides thereof. In other words, the resin passage 12 communicates the inlet 11a with the intake ports 3 disposed on the both sides of the inlet 11a. In the cylinder head main body 10 of the present embodiment, an opening 12a of the resin passage 12 which opening opens to the intake port 3 is formed in an oval shape.

As shown in FIG. 4, the resin part 20 is an insulation member that inhibits the heat of the cylinder head main body 10 from being transferred to the intake air. The resin part 20 is formed of resin having lower thermal conductivity than that of the material of the cylinder head main body 10, and more preferably is formed of resin having high heat resistance. The resin part 20 is disposed on the inner surface of the intake port 3 except for a portion (a downstream portion) on the side of the intake valve hole 3g of the overall length of the intake port 3.

In the present embodiment, among the resin parts 20 arranged in the four intake ports 3, two resin parts 20 adjacent to each other are connected by a resin portion 21 provided therebetween. Hereinafter, the resin portion 21 provided between the two resin portions 20 adjacent to each other is referred to as a "connecting resin portion 21". The connecting resin portion 21 is formed by solidifying the molten resin in the resin passage 12. In the present embodiment, one connecting resin portion 21 is provided between the two resin portions 20 arranged in the first intake port 3A and the second intake port 3B, and another connecting resin portion 21 is provided between the two resin portions 20 arranged in the third intake port 3C and the fourth intake port 3D.

[2. Method of Manufacturing Cylinder Head]

Here, description will now be made in relation to a method of manufacturing a cylinder head 1 by arranging the resin parts 20 in the intake ports 3 of the cylinder head main body 10. As described above, the resin parts 20 are formed by injection molding. Specifically, first of all, a non-illustrated sliding mold is placed in the intake port 3 of the cylinder head main body 10, and defines a space to be supplied with the molten resin (hereinafter referred to as "injection space") by the inner surface of the port circumferential wall part 4 and the outer surface of the sliding mold. For avoiding leakage of the molten resin from the injection space in this event, the end parts (upstream end part and downstream end part of the intake port 3) of the injection space is sealed by, for example, placing a seal member (not shown) or machining the sealing face.

Then, the tip of the injection machine is inserted into the inlet 11a, and the molten resin is injected into the resin passage 12 from the injection machine. The molten resin injected into the resin passage 12 is supplied to the two intake ports 3 through the resin passage 12. The molten resin flows along the inner surface of the port circumferential wall part 4 and spreads into the injection space. This accompanies discharging of gas in the intake port 3 from the outlet to the outside of the cylinder head 1. Since the pressure of the injection space is increased as the supply of the molten resin proceeds, the cylinder head main body 10 of the present embodiment, in which the port circumferential wall part 4 is reinforced, can be avoided from generation of crazes and cracks on the port circumferential wall part 4. When the injection space is filled with the molten resin, injection of the molten resin into the inlet 11a is stopped. Then, when the molten resin is solidified, the resin part 20 is formed in intake port 3. Then the slide mold placed in the intake port 3 is removed, and the cylinder head 1 is completed.

[3. Actions and Effects]

(1) According to the above cylinder head 1, the port circumferential wall part 4 can be reinforced by the outer longitudinal rib 14. Further, the outer longitudinal rib 14, which is reinforced by the boss parts 13 and 13' disposed at the base position serving as one end portion, can further enhance the reinforcing function of the port circumferential wall part 4. Accordingly, the above cylinder head 1 can avoid crazes and cracks when arranging the resin part 20 as an insulation member by injection molding of the resin.

Further, since the mounting holes 5 and 6 for attaching the fuel injection valve (in-cylinder injection valve, port injection valve) and a fixing boss 7 for attaching the delivery pipe that supplies fuel to the fuel injection valve are provided to the intake-side wall part 1a of the cylinder head 1, there is a problem of such a narrow space. As a solution to this problem, in the above cylinder head 1, since the outer longitudinal ribs 14 are reinforced by utilizing the boss parts 13 forming thereon the gas relief holes 13a, it is possible to efficiently utilize a narrow space and therefore avoid an increase in the size of the cylinder head 1.

Further, since the above cylinder head 1 arranges the resin part 20 in the intake port 3, the resin part 20 functions as an insulation member between the port circumferential wall part 4 and the intake air flowing inside the intake port 3. This can reduce the heat transferred from the inner surface of the port circumferential wall part 4 to the intake air so that it is possible to suppress the temperature rise of the intake air.

Therefore, decrease in the intake air volume and generation of knocking can be suppressed, so that the engine performance can be enhanced.

(2) According to the cylinder head 1 described above, since the two outer longitudinal ribs 14 are provided for one intake port 3, it is possible to further reinforce the port circumferential wall part 4 and avoid crazes and cracks when injection molding is carried out. Furthermore, since the boss part 13 is disposed at the base portion of at least one of the outer longitudinal ribs 14, it is possible to efficiently utilize the narrow space and therefore avoid enlargement of the cylinder head 1.

(3) According to the above cylinder head 1, since the inner longitudinal rib 16 extending along the flow direction D2 is also provided on the inner surface (the lower surface 4b) of the lower side of the port circumferential wall part 4, the port circumferential wall part 4 can be further reinforced, so that crazes and crack when injection molding is carried out can be avoided.

(4) According to cylinder head 1 described above, since the inner auxiliary ribs 17 are formed on the both sides of the inner longitudinal rib 16, the port circumferential wall part 4 can be further reinforced, so that crazes and crack during the injection molding can be avoided. Furthermore, the projecting amounts of the inner auxiliary ribs 17 are smaller than that of the inner longitudinal rib 16 and therefore less likely to hinder the flow of the molten resin, so that it is possible to secure the wall thickness of the resin part 20.

(5) According to the above cylinder head 1, since the inner lateral ribs 18 extending along a direction intersecting the flow direction D2 are also provided on the lower surface 4b of the port circumferential wall part 4, the port circumferential wall part 4 can be further effectively reinforced, so that crazes and crack when the injection molding is carried out can be avoided. Furthermore, the projecting amounts of the inner lateral rib 18 are smaller than that of the inner longitudinal rib 16 and therefore less likely to hinder the flow of the molten resin, so that it is possible to secure the wall thickness of the resin part 20.

(6) According to the cylinder head 1 described above, since the outer lateral ribs 15 are bridged between the port circumferential wall parts 4 of the neighboring intake ports 3, it is also possible to reinforce the spaces between the intake ports 3, and therefore crazes and crack during the injection molding can be avoided.

(7) In cases where the lower surface 4b of the port circumferential wall part 4 is curved into an arch shape so as to protrude upward, it is possible to increase the wall thickness of the center portion in the port aligning direction D1 of the port circumferential wall part 4, and therefore crazes and crack while the injection molding is carried out can be avoided.

(8) In the above cylinder head 1, the connecting resin portion 21 is disposed between the two intake ports 3 is provided in addition to the resin part 20 arranged in the intake port 3. With this structure, it is possible to increase the heat insulation effect between the intake ports 3 and further suppress the temperature rise of the intake air. Consequently, it is possible to suppress the decrease in the intake air volume and the occurrence of knocking, thereby improving the engine performance.

In the above cylinder head 1, the lower end surface of the mounting part 11 is provided parallel to the cylinder head lower surface 1b, and the inlet 11a for injecting molten resin to the lower end surface opens. Therefore, since, when the molten resin is injected, horizontally arranging the cylinder head lower surface 1b horizontally arranges the lower end surface, it is possible to set the injection machine from the vertical direction. In other words, in molding the resin part 20, it is possible to easily hold the posture of the cylinder head main body 10, and to easily inject the molten resin because the direction of the injection of the molten resin can be the vertical direction.

[4. Modification]

The structure of the cylinder head 1 described above is an example, and the structure is not limited to this. For example, the embodiment may be applied to a cylinder head for an engine except for a cylinder head of a straight four-cylinder engine, or may be applied to a cylinder head for an engine not having both an in-cylinder injection valve and a port-injection valve. The shape of the intake port 3 is not limited to the bifurcated shape as described above, and the fixing boss 7 may be omitted.

Furthermore, although the above-described cylinder head 1 is provided with five types of ribs 14 to 18, the number, shapes, and the arrangement of these ribs 14 to 18 are all exemplary and are not limited to those described above.

For example, one outer longitudinal rib 14 may be arranged in the prospective thinnest portion (e.g., the center portion) of the port circumferential wall part 4, three or more outer longitudinal ribs 14 may be arranged. Further, when multiple outer longitudinal ribs 14 are provided for one intake port 3, the shapes of these outer longitudinal ribs 14 may be all the same or may be different. Furthermore, if the engine has multiple cylinders, the structure of the outer longitudinal ribs 14 provided to the respective intake ports 3 may be all the same or may be different.

Still furthermore, the outer lateral rib 15 may directly connected the port circumferential wall parts 4 to each other rather than the neighboring outer longitudinal ribs 14 to each other. Alternatively, the outer lateral ribs 15 do not have to be arranged between all of the port circumferential wall parts 4, or may be omitted. Additionally, multiple inner longitudinal ribs 16 may be provided for one intake port 3, or one or three or more inner auxiliary ribs 17 may be provided for one intake port 3. Further, the positions and the projecting amounts of the inner longitudinal rib 16, the inner auxiliary ribs 17, and the inner lateral ribs 18 are preferably set in consideration of reinforcing capability of the port circumferential wall part 4, the flowability of the molten resin, and the thickness of the resin part 20. These inner ribs 16, 17, are 18 are not essential and can be omitted.

The above cylinder head 1 described is provided with the two types of boss parts 13 and 13' at the base portion of the outer longitudinal ribs 14. In cases where a single outer longitudinal rib 14 is provided, the dummy boss part 13' is not essential. Further, when multiple outer longitudinal ribs 14 are provided, the dummy boss part 13' may be omitted. The shapes and the arrangement of the boss parts 13 and 13' described above are examples and are not limited those in the description.

The structure of the mounting circumferential wall part 6b is an example. Alternatively, the mounting circumferential wall part 6b may be extended from the intake-side wall part 1a to the flange face 3f along the port circumferential wall part 4. In this case, the above protruding parts 4a can be omitted. Further, a boss having a mounting hole 5 for attaching the in-cylinder injection valve may be directly provided on the intake-side wall part 1a.

The above structure to arrange the resin part 20 in the intake port 3 is a merely example. Alternatively, the mounting part 11 (inlet 11a) may be provided for each individual intake port 3. This structure eliminates the requirement for the resin passage 12, and therefore does not form the connecting resin portion 21. Further, the lower end surface of the mounting part 11 do not have to be parallel to the cylinder head lower surface 1b. The structure for draining out water droplets in the mounting hole 6 to the outside is not limited to the above drain hole 6c.

DESCRIPTION OF REFERENCE SIGNS 1 cylinder head
1a intake-side wall part
1b cylinder head lower surface
2 combustion chamber
3 intake port
4 port circumferential wall part
4b lower surface (lower inner surface)
6 mounting hole of the in-cylinder injection valve
6b mounting circumferential wall part
10 cylinder head main body
11 mounting part
11a inlet
12 resin passage
12a opening
13,13'boss part
13a gas relief hole (hole part)
14 outer longitudinal rib
15 outer lateral rib
16 inner longitudinal rib
17 inner auxiliary rib
18 inner lateral rib
20 resin part

The invention claimed is:

1. A cylinder head comprising:
 a cylinder head main body including,
  an intake-side wall part that upwardly extends from a cylinder head lower surface coupled to a cylinder block,
  a port circumferential wall part that forms therein an intake port communicating with a combustion chamber of an engine
  an outer longitudinal rib that projects from an outer surface of the port circumferential wall part on a side of the cylinder head lower surface and that extends in a direction away from the intake-side wall part along a flow direction of intake air flowing inside the intake port, and
  a boss part that is bulged from the intake-side wall part on one end portion of the outer longitudinal rib and that has a hole part that discharges gas in the intake port when injection molding of the resin part is carried out and
 a resin part disposed along an inner surface of the port circumferential wall part,
 wherein the resin part has a lower thermal conductivity than a thermal conductivity of a material of the cylinder head main body.

2. The cylinder head according to claim 1, wherein two of the outer longitudinal ribs are provided for the intake port; and
 the boss part is disposed on the one end portion of at least one of the outer longitudinal ribs.

3. The cylinder head according to claim 2, wherein
 the engine is a multi-cylinder engine and the cylinder head comprises a plurality of the intake ports arranged in parallel; and
 the cylinder head further comprises an outer lateral rib bridged between the port circumferential wall parts of the intake ports, the port circumferential wall parts are adjacent to each other.

4. The cylinder head according to claim 2, wherein
 an inner surface of the port circumferential wall part on a side of the cylinder head lower surface is bent into an arch so as to protrude into the intake port.

5. The cylinder head according to claim 2, further comprising:
 an inner longitudinal rib that projects from an inner surface of the port circumferential wall part on a side of the cylinder head lower surface and that extends between the two outer longitudinal ribs along the flow direction.

6. The cylinder head according to claim 5, wherein
 the engine is a multi-cylinder engine and the cylinder head comprises a plurality of the intake ports arranged in parallel; and the cylinder head further comprises an outer lateral rib bridged between the port circumferential wall parts of the intake ports, the port circumferential wall parts are adjacent to each other.

7. The cylinder head according to claim 5, wherein
an inner surface of the port circumferential wall part on a side of the cylinder head lower surface is bent into an arch so as to protrude into the intake port.

8. The cylinder head according to claim 5, further comprising:
an inner lateral rib that projects from the inner surface of the port circumferential wall part, that extends along a direction intersecting the flow direction, and that has a projecting amount smaller than that of the inner longitudinal rib.

9. The cylinder head according to claim 8, wherein
the engine is a multi-cylinder engine and the cylinder head comprises a plurality of the intake ports arranged in parallel; and
the cylinder head further comprises an outer lateral rib bridged between the port circumferential wall parts of the intake ports, the port circumferential wall parts are adjacent to each other.

10. The cylinder head according to claim 8, wherein
an inner surface of the port circumferential wall part on a side of the cylinder head lower surface is bent into an arch so as to protrude into the intake port.

11. The cylinder head according to claim 5, further comprising:
two inner auxiliary ribs that project from the inner surface of the port circumferential wall part, that extend along the flow direction on both side of the inner longitudinal rib, and that have projecting amounts smaller than that of the inner longitudinal rib.

12. The cylinder head according to claim 11, wherein
the engine is a multi-cylinder engine and the cylinder head comprises a plurality of the intake ports arranged in parallel; and
the cylinder head further comprises an outer lateral rib bridged between the port circumferential wall parts of the intake ports, the port circumferential wall parts are adjacent to each other.

13. The cylinder head according to claim 11, wherein
an inner surface of the port circumferential wall part on a side of the cylinder head lower surface is bent into an arch so as to protrude into the intake port.

14. The cylinder head according to claim 11, further comprising;
an inner lateral rib that projects from the inner surface of the port circumferential wall part, that extends along a direction intersecting the flow direction, and that has a projecting amount smaller than that of the inner longitudinal rib.

15. The cylinder head according to claim 14, wherein
the engine is a multi-cylinder engine and the cylinder head comprises a plurality of the intake ports arranged in parallel; and
the cylinder head further comprises an outer lateral rib bridged between the port circumferential wall parts of the intake ports, the port circumferential wall parts are adjacent to each other.

16. The cylinder head according to claim 14, wherein
an inner surface of the port circumferential wall part on a side of the cylinder head lower surface is bent into an arch so as to protrude into the intake port.

17. The cylinder head according to claim 1, wherein
the engine is a multi-cylinder engine and the cylinder head comprises a plurality of the intake ports arranged in parallel; and
the cylinder head further comprises an outer lateral rib bridged between the port circumferential wall parts of the intake ports, the port circumferential wall parts are adjacent to each other.

18. The cylinder head according to claim 17, wherein
an inner surface of the port circumferential wall part on a side of the cylinder head lower surface is bent into an arch so as to protrude into the intake port.

19. The cylinder head according to claim 1, wherein
an inner surface of the port circumferential wall part on a side of the cylinder head lower surface is bent into an arch so as to protrude into the intake port.

* * * * *